United States Patent
Shintani et al.

(10) Patent No.: US 11,671,953 B2
(45) Date of Patent: Jun. 6, 2023

(54) EFFICIENT CHANNEL SCANNING FOR MEDIA RENDERING DEVICE

(71) Applicant: SONY GROUP CORPORATION, Tokyo (JP)

(72) Inventors: Peter Shintani, San Diego, CA (US); Loren Pineda, San Diego, CA (US); Max Wu, San Diego, CA (US); Tanmay Agnihotri, San Diego, CA (US); Luke Fay, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/484,387

(22) Filed: Sep. 24, 2021

(65) Prior Publication Data
US 2023/0098458 A1    Mar. 30, 2023

(51) Int. Cl.
*H04W 72/0453*    (2023.01)
*H04W 64/00*    (2009.01)

(52) U.S. Cl.
CPC ....... *H04W 72/0453* (2013.01); *H04W 64/00* (2013.01)

(58) Field of Classification Search
CPC .... H04N 21/4345; H04N 5/50; H04N 21/426; H04W 72/0453; H04W 64/00
See application file for complete search history.

(56) References Cited

U.S. PATENT DOCUMENTS

| | | | |
|---|---|---|---|
| 5,152,012 A | 9/1992 | Schwob | |
| 5,307,513 A * | 4/1994 | Harada | H03J 5/0263 455/161.3 |
| 7,793,321 B2 | 9/2010 | Simms et al. | |
| 8,296,807 B2 | 10/2012 | Yuen et al. | |
| 9,300,896 B2 | 3/2016 | Eyer | |
| 2008/0025695 A1 | 1/2008 | Toji | |
| 2009/0135309 A1* | 5/2009 | DeGeorge | H04N 21/4345 348/732 |
| 2014/0354890 A1 | 12/2014 | Eyer | |
| 2015/0116596 A1 | 4/2015 | Tateno | |

FOREIGN PATENT DOCUMENTS

EP    2373008 A2    10/2011
JP    2007150856 A    6/2007

OTHER PUBLICATIONS

Humax TiVo User Guide ("TiVo") (Year: 2004).*

* cited by examiner

*Primary Examiner* — Joshua L Schwartz
(74) *Attorney, Agent, or Firm* — Chip Law Group

(57) ABSTRACT

A media rendering device and method for scan of channels on the media rendering device is provided. The media rendering device determines a first geographical region associated with a location of the media rendering device. A first set of over-the-air (OTA) channels may be communicated in the first geographical region. The media rendering device determines a second geographical region within a threshold distance from the location of the media rendering device. A second set of OTA channels may be communicated in the second geographical region. The media rendering device receives a first user input to scan the first set of OTA channels and the second set of OTA channels, and configures the first set of OTA channels and the second set of OTA channels on the media rendering device, based on the scan of the first set of OTA channels and the second set of OTA channels.

21 Claims, 6 Drawing Sheets

EFFICIENT CHANNEL SCANNING FOR MEDIA RENDERING DEVICE

REFERENCE

None.

FIELD

Various embodiments of the present disclosure relate to media rendering devices. More specifically, various embodiments of the present disclosure relate to method for efficiently scanning channels on the media rendering devices.

BACKGROUND

Advancements in the field of television broadcasting have led to development of various techniques to scan channels on media rendering devices (for example, televisions, sound systems, etc.) Typically, a world-wide media rendering device may employ traditional methods to scan channels. For example, the media rendering device may tune to each frequency from a selected broadcast frequency band during the scanning process (such as an auto-program of an initial setup of the media rendering device). The process of scanning channels may be time-consuming as the number of channels and/or channel locations may vary over different geographical regions. In general, the greater the number of channels, the greater the time required for scanning the channels, and this may be undesirable for a user of the media rendering device.

Limitations and disadvantages of conventional and traditional approaches will become apparent to one of ordinary skill in the art, through comparison of described systems with some aspects of the present disclosure, as set forth in the remainder of the present application and with reference to the drawings.

SUMMARY

A media rendering device and a method for scanning channels on the media rendering device is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
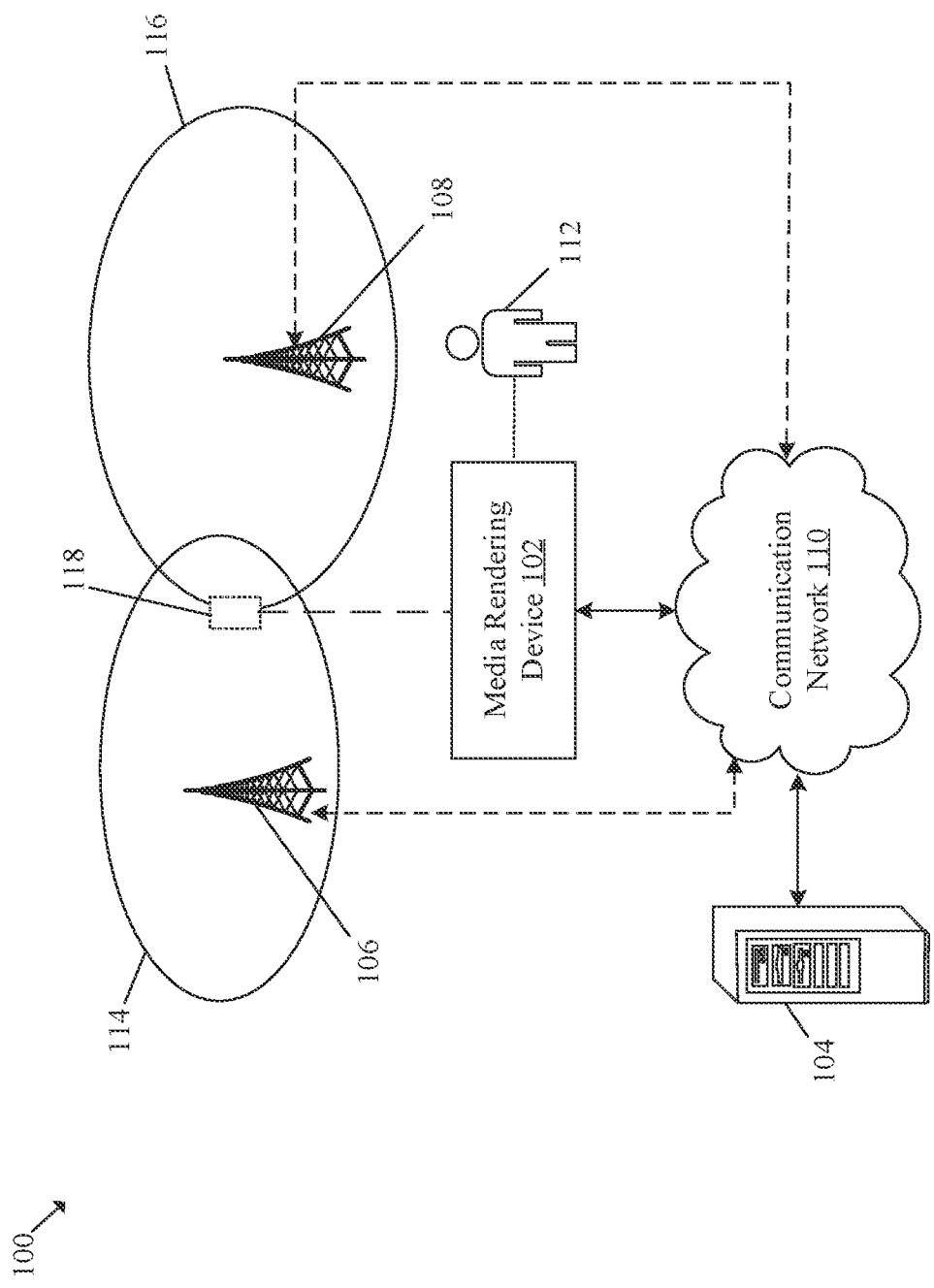
FIG. 1 is a block diagram that illustrates an exemplary environment for scanning channels on a media rendering device, in accordance with an embodiment of the present disclosure.

The following described implementations may be found in the disclosed media rendering device (here a media rendering device may function on real-time or non-real-time data) and method for efficient scanning of channels on the media rendering device. Exemplary aspects of the disclosure provide the media rendering device (for example, a television (TV), a display device, and a sound system) that may control configuration settings (for example, initial setup menu settings, or main menu settings) of the media rendering device in order to provide efficient channel scanning. The media rendering device may be configured to determine a first geographical region (for example a city, a state, or a country) associated with a location of the media rendering device, via user input or other means (e.g., GPS, external server (such as server 104 shown in FIG. 1). The media rendering device may be further configured to determine a second geographical region within a predefined distance (such as a threshold distance) from the location of the media rendering device. The second geographical region may be determined based on user inputs or other means. Hereinafter, the location refers to a current location or a selected location where the media rendering device may be available or located). The second geographical region may be a neighboring region to the first geographical region. Transmission(s) or signal broadcasts in both the first geographical region and the second geographical region may be detected in a frequency scan by the media rendering device. Additionally, the media rendering device may be configured to receive a user input to scan a first set of over-the-air (OTA) channels and/or a second set of OTA channels that may be transmitted or broadcasted in the determined first geographical region and the determined second geographical region, respectively. For example, each of the first set of OTA channels and the second set of OTA channels may correspond to at least one of a television channel, an Amplitude Modulated (AM) channel or a Frequency Modulated (FM) channel. In an embodiment, the first set of OTA channels associated with the first geographical region are different from the second set of OTA channels associated with the second geographical region.

The received user input may indicate a confirmation from the user to extend a first channel map of the media rendering device to a second channel map of the media rendering device. Herein, the first channel map may include the first set of OTA channels related to the first geographical region and the second channel map may include both the first set of OTA channels and the second set of OTA channels related to the second geographical region. The first set of OTA channels and the second set of OTA channels may be configured on the media rendering device, based on a scan of the first set of OTA channels and a scan of the second set of OTA channels. In an embodiment, the scan or the configuration of the second set of OTA channels may only include OTA channels (i.e., non-overlapping) which may not be included in the first set of OTA channels. Thus, the disclosed media rendering device may only entail the extra channels of the second geographical region which are not already listed in the first geographical region. Therefore, the disclosed media rendering device may optimize channel scan time, extend a channel map that may be configured on the media rendering device, and efficiently scan and configure channels of both the current region and channels of a nearby region on the media rendering device.

FIG. 1 is a block diagram that illustrates an exemplary network environment for scanning channels on a media rendering device, in accordance with an embodiment of the disclosure. With reference to FIG. 1, there is shown a network environment 100. The network environment 100 includes a media rendering device 102, a server 104, a first over-the-air (OTA) service provider device 106, a second OTA service provider device 108, and a communication network 110. The media rendering device 102 may be coupled to the server 104, the first OTA service provider device 106, and the second OTA service provider device 108, via the communication network 110. In FIG. 1, there is further shown a user 112 associated with the media rendering device 102. The media rendering device 102 may be operated based on a user input of the user 112 or based on other configured functions of the media rendering device 102. There is further shown in FIG. 1, a first geographical region 114 and a second geographical region 116. The first OTA service provider device 106 may be located in the first geographical region 114 and may communicate or broadcast a first set of OTA channels in the first geographical region 114. Similarly, the second OTA service provider device 108 may be located in the second geographical region 116 and may communicate or broadcast a second set of OTA channels in the second geographical region 116. Also shown in FIG. 1, the media rendering device 102 may be situated and operated at a location 118.

It may be noted that the first OTA service provider device 106 and the second OTA service provider device 108, as illustrated in FIG. 1, are for exemplary purpose. The network environment 100 may include only one service provider device or more than two service provider devices for communication or broadcast of OTA channels, without deviation from the scope of the disclosure. In case multiple service provider devices communicate or broadcast OTA channels, there may be an overlap between the different OTA channels that may be accessible in a particular location at which the media rendering device 102 may be located. For the sake of brevity and simplicity this disclosure considers two service provider devices that may communicate or broadcast OTA channels.

The media rendering device 102 may include suitable logic, circuitry, interfaces, and/or code (i.e., a set of instructions) that may be configured to scan OTA channels and configure (or tune to) the scanned OTA channels on the media rendering device 102. The media rendering device 102 may store OTA channel frequencies of the scanned OTA channels on the media rendering device 102. Based on a user input from the user 112, the media rendering device 102 may switch to or select a particular OTA frequency, and render media content that may be aired or communicated on the selected OTA frequency. The media rendering device 102 may be configured to communicate with the first OTA service provider device 106 associated with the first geographical region 114 and communicate with the second OTA service provider device 108 associated with the second geographical region 116. For example, the media rendering device 102 may receive OTA channel information associated with the first geographical region 114 and broadcast signals (such as, the first set of OTA channels) associated with the first geographical region 114 from the first service provider device 106. Further, the media rendering device 102 may receive OTA channel information associated with the second geographical region 116 and broadcast signals (such as, the second set of OTA channels) associated with the second geographical region 116 from the second OTA service provider device 108. In an embodiment, the media rendering device 102 may be configured to communicate with the server 104 and receive the OTA channel information associated with the first geographical region 114 and/or the second geographical region 116 from the server 104. The OTA channel information may be pre-stored on the server 104 or the server 104 may be configured to obtain the OTA channel information in real-time and provide the OTA channel information to the media rendering device 102. Examples of the media rendering device 102 may include, but are not limited to, a television, a monitor, a set-top box, a display device, a mobile phone, a smart phone, a tablet computing device, a personal computer, a gaming console, a media player, a sound system, a smart audio device, a home theatre system, a digital camera, a head-mounted device, an automotive electronic device, an electronic musical instrument, or other consumer electronic device.

The OTA service provider devices (such as, the first OTA service provider device 106, and the second OTA service provider device 108) may include suitable logic, circuitry, and/or interfaces that may be configured to transmit and receive signals associated with one or more service providers. The transmitted or received signals may correspond to a set of OTA channels, for example, radio frequency (RF) signals, which may be broadcast in a certain geographical region (such as, the first geographical region 114, and the second geographical region 116). The OTA service provider devices may be associated with the service providers that may follow either standard broadcasting protocols or common channel broadcasting protocols. For example, each OTA service provider device may include a transmitter configured to transmit selected OTA channel information, media content, and/or other multimedia services to the media rendering device 102 based on the current location of the media rendering device 102 within its emissions (like an available channel guide in its region). Examples of the service provider may include, but are not limited to, a satellite broadcaster, a terrestrial broadcaster, a digital television broadcaster, a cellular network broadcaster, or Internet broadcaster. Examples of the OTA service provider devices may include, but are not limited to, a radio antenna, a monopole antenna, a dipole antenna, an array antenna, or a loop antenna.

The server 104 may include suitable logic, circuitry, and interfaces, and/or code that may be configured to receive OTA channel information from service providers in a particular geographical region and store the received OTA channel information. The server 104 may transmit the OTA channel information associated with the geographical region to the media rendering device 102 In an embodiment, the server 104 may be configured to receive the OTA channel information from the service providers in a particular geographical region in real time and transmit the received OTA channel information to the media rendering device 102. The OTA channel information associated with the geographical region may be transmitted to the media rendering device 102 based on a user input received from the media rendering device 102 or automatically based on a request from the media rendering device 102. The server 104 may be further configured to store a channel map that may include the set of OTA channels broadcasted in a certain geographical region (such as, the first geographical region 114 or the second geographical region 116). The server 104 may be implemented as a cloud server or a hybrid server and may execute operations through web applications, cloud applications, HTTP requests, repository operations, file transfer, and the like. Other example implementations of the server 104 may include, but are not limited to, a database server, a file server, a web server, a media server, an application server, a mainframe server, a hybrid server, a distributed computing platform or a cloud computing server.

In one embodiment, the server 104 may be implemented as a plurality of distributed cloud-based resources by use of several technologies that are well known to those ordinarily skilled in the art. A person with ordinary skill in the art will understand that the scope of the present disclosure may not be limited to the implementation of the server 104 and the media rendering device 102 as two separate entities. In certain embodiments, the functionalities of the server 104 can be incorporated in its entirety or at least partially into the media rendering device 102, without any departure from the scope of the present disclosure.

The communication network 110 may include a communication medium through which the media rendering device 102, the server 104, the first OTA service provider device 106, and the second OTA service provider device 108 may communicate with each other, either separately and/or collectively. The communication network 110 may be one of a wired connection, a wireless connection, or a combination thereof. Typical examples of the communication network 110 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to couple with the communication network 110 in accordance with various communication protocols, which may include wired or wireless protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, etc.

In operation, the media rendering device 102 may be configured to receive a user input, from the user 112 or other means, (for example, to turn-on the media rendering device 102) which may instruct the media rendering device 102 to scan OTA channels. The user input may be directly received on the media rendering device 102 and/or another device (such as, a mobile phone (not shown in the FIG. 1)) coupled to the media rendering device 102. The media rendering device 102 may be configured to receive the user input, via an I/O interface (shown in FIG. 2) of the media rendering device 102. The I/O interface may be provided directly through a display device (shown in FIG. 2) of the media rendering device or may be provided via an application installed on an external device (not shown in FIG. 1) coupled to the media rendering device 102. The media rendering device 102 may be configured to determine a first geographical region (such as the first geographical region 114) associated with a location (such as the location 118). A first set of OTA channels may be communicated or broadcast in the determined first geographical region 114, via the first OTA service provider device 106. The location 118 of the media rendering device 102 may correspond to a current geo-location where the media rendering device 102 may be present and/or in use. The first geographical region 114 (including the location 118), may correspond to an area of a state or a country to which the current geo-location (i.e., the location 118) may belong. The determination of the first geographical region 114 is described, for example, in FIG. 3. The second geographical region 116 may be within a threshold distance from the location 118 of the media rendering device. For example, the second geographical region 116 may be neighboring region of the first geographical region 114. In an embodiment, the location 118 may be at a border area or an overlapping area of the first geographical region 114 and the second geographical region 116. The threshold distance may in certain meters (m), yards, kilometers (KM), or miles. For example, the first geographical region 114 may be the United States of America and the second geographical region 116 may be Canada. In another example, in a country like India, where regional OTA channels may vary, the first geographical region 114 may be a first state like Tamil Nadu and the second geographical region 116 may be a second state neighboring the first state like Karnataka. Herein both the first state and the second state within the country may have different OTA channels that can be scanned by the media rendering device 102.

The media rendering device 102 may be configured to determine the second geographical region (such as the second geographical region 116) within the threshold distance from the location 118. A second set of OTA channels may be broadcasted in the determined second geographical region 116, via the second OTA service provider device 108. The threshold distance from the location 118 of the media rendering device 102 may correspond to a pre-defined range in which a signal broadcasted from a service provider device (such as the second OTA service provider device 108) in the second geographical region 116 may be detected. The broadcasted signal may have pre-determined signal strength, which may depend on the pre-defined range. For examples, for the pre-defined range of 1000 meters, a signal strength of the pre-determined signal strength may be −70 dBm, and for the pre-defined range of 200 meters, the pre-determined signal strength may be −100 dBm. Further, for the pre-defined range of 500 meters, the pre-determined signal strength may be −85 dBm. If the signal strength of the broadcasted signal is higher than a pre-determined threshold of signal strength for a particular pre-defined range, the broadcasted signal may be detected or scanned by the media rendering device 102 within the pre-defined range from the location 118 in the first geographical region 114. In an embodiment, the media rendering device 102 may be configured to receive a user input, via the I/O Interface 208 from the user 112, to set the pre-defined range as a threshold distance. In another embodiment, the media rendering device 102 may be configured to set the pre-defined range as a default threshold distance, which may be stored in memory (shown in FIG. 2). The determination of the second geographical region 116 is described, for example, in FIG. 3.

Figure 3:
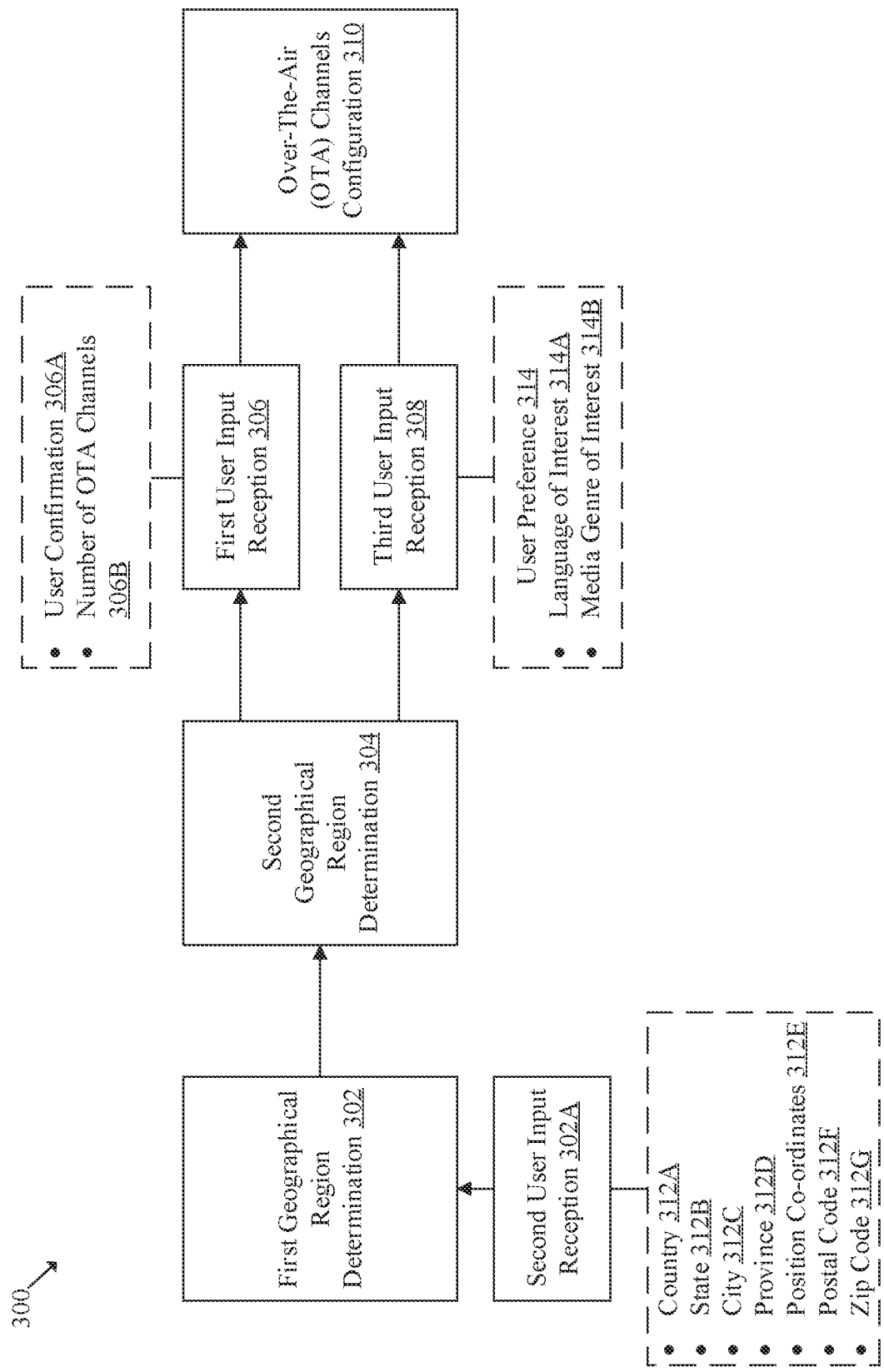
FIG. 3 is a diagram that illustrates a first exemplary processing pipeline for scanning a set of over-the-air (OTA) channels on the media rendering device, in accordance with an embodiment of the present disclosure.

The media rendering device 102 may be configured to receive a first user input from a user (e.g., the user 112) or other means to scan the first set of OTA channels and the second set of OTA channels, as described, for example, in FIG. 3. In an embodiment, the media rendering device 102 may be configured to automatically scan the first set of OTA channels based on the current location (such as the location 118). In another embodiment, the media rendering device 102 may be configured to automatically scan the first set of OTA channels and the second set of OTA channels based on the current location 118 and/or based on user-preferred OTA channels selected based on a user input from the user 112. Based on the scan of the first set of OTA channels and the second set of OTA channels, the media rendering device 102 may configure (i.e., tune) the first set of OTA channels and the second set of OTA channels on the media rendering device 102. The configuration of the scanned first set of OTA channels and second set of OTA channels on the media rendering device 102 may include a storage of OTA channel information and/or OTA channel frequency associated with each of the scanned OTA channels on the media rendering device 102. The media rendering device 102 may tune into each channel of the first set of OTA channels and the second set of OTA channels (i.e., channels not already included in the first set of OTA channels), via a tuner or a frequency scanner in the media rendering device 102. The tuner or frequency scanner may be configured to tune an OTA channel frequency of a selected OTA channel to receive a signal broadcasted on the selected OTA channel. The tuner or the frequency scanner may amplify the received signal of the selected OTA channel, and further demodulate the amplified signal of the selected OTA channel on the media rendering device 102. A detailed description for the other components or systems of the media rendering device 102 is omitted from the disclosure for the sake of brevity.

In an example, the media rendering device 102 may be configured to receive a user input indicative of an approval or confirmation to scan the first set of OTA channels related to the first geographical region 114. The media rendering device 102 may configure the first set of OTA channels on the media rendering device 102 based on the received user input. In another example, the media rendering device 102 may receive a user input indicative of an approval or confirmation to scan the first set of OTA channels, and the second set of OTA channels. In another example, the media rendering device 102 may receive a user input to selectively choose OTA channels, and accordingly configure the selectively chosen OTA channel from the first set of OTA channels and the second set of OTA channels. The selected OTA channels may be stored in the media rendering device 102. Thus, due to the selection of the OTA channels from the first set of OTA channels related to the first geographical region 114 and/or the second set of OTA channels related to the second geographical region 116, the disclosed media rendering device 102 may provide efficient scan and configuration of the OTA channels on the media rendering device 102 by ensuring no overlapping channels. This may further allow the media rendering device 102 to optimize the time consumed for scan and configuration of the OTA channels on the media rendering device 102.

Figure 2:
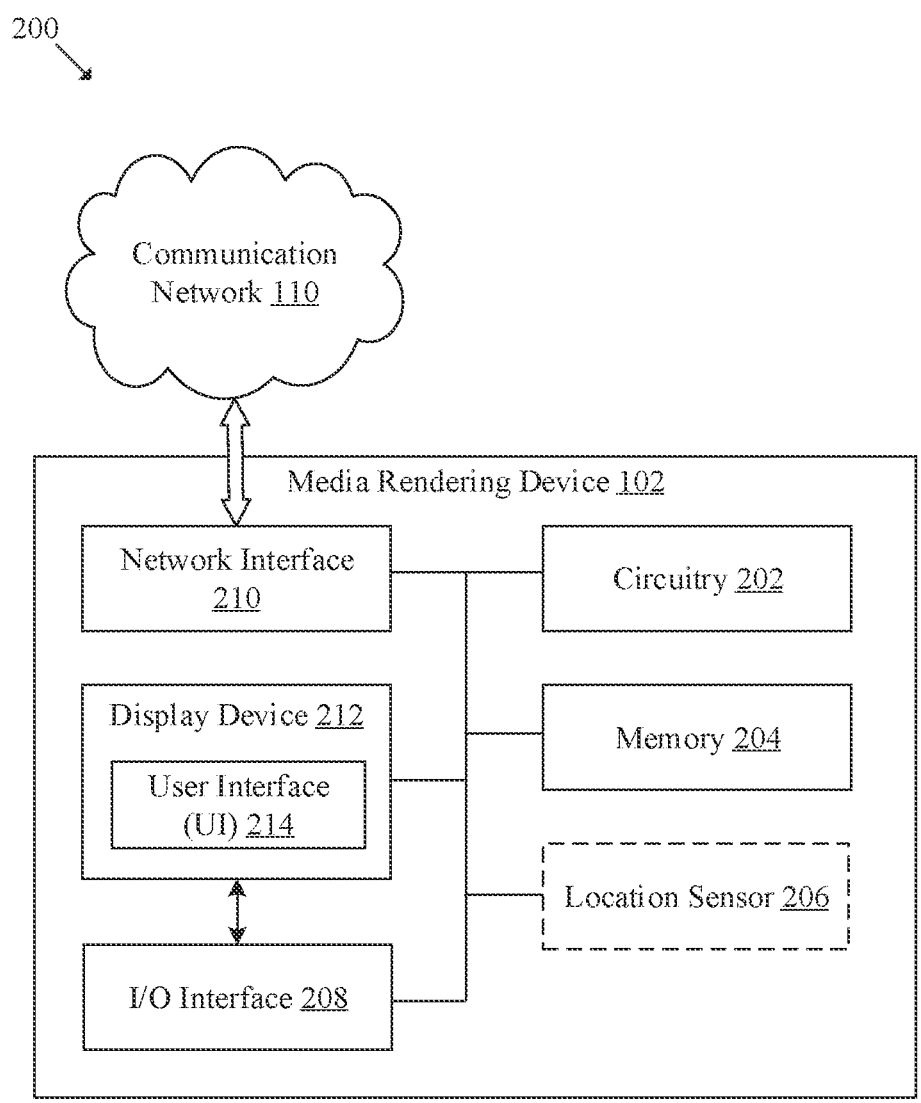
FIG. 2 is a block diagram that illustrates an exemplary media rendering device of FIG. 1, in accordance with an embodiment of the present disclosure.

FIG. 2 is a block diagram that illustrates an exemplary media rendering device of FIG. 1, in accordance with an embodiment of the disclosure. FIG. 2 is explained in conjunction with elements from FIG. 1. With reference to FIG. 2, there is shown an exemplary block diagram 200 of the media rendering device 102. The media rendering device 102 may include at least circuitry 202 and a memory 204. The media rendering device 102 may also include a location sensor 206, a display device 212 (e.g., screen) and an input/output (I/O) interface 208. Further, the media rendering device 102 may include a network interface 210, through which the media rendering device 102 may be coupled to the communication network 110. The media rendering device 102 may also include a transceiver (not shown in the Figure) built into the circuitry 202 or as a separate unit that may be coupled to one of the elements (e.g., the network interface 210) of the media rendering device 102.

The circuitry 202 may include suitable logic, circuits, interfaces, and/or code that may be configured to execute program instructions associated with different operations to be executed by and/or on the media rendering device 102. The operations may include, but not limited to, determination of the first geographical region 114, determination of the second geographical region 116, reception of the first user input to scan and configure the first set of OTA channels and the second set of OTA channels on the media rendering device 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the program instructions to be executed by the circuitry 202 of the media rendering device 102. In an embodiment, the memory 204 may be configured to store channel maps including a set of OTA channels (such as the first set of OTA channels and the second set of OTA channels). The memory 204 may be configured to store and execute other instructions as required for the functioning of the media rendering device 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The location sensor 206 may include suitable logic, circuitry, code and/or interfaces that may be configured to determine a current geo-location of the media rendering device 102. An example of the location sensor 206, may include, but are not limited to, a Global Navigation Satellite System (GNSS)-based sensor of the media rendering device 102. Examples of the GNSS-based sensor may include, but are not limited to, global positioning sensor (GPS), Global Navigation Satellite System (GLONASS), or other regional navigation systems and/or sensors. A person with ordinary skill in the art will understand that the scope of the present disclosure may not be limited to the implementation of the location sensor 206 incorporated in its entirety or at least partially in the media rendering device 102. In certain embodiments, the location sensor 206 and the media rendering device 102 may be implemented as two separate entities, without a departure from the scope of the present disclosure. In other words, in some embodiments, the media rendering device 102 may not include the location sensor 206.

The I/O Interface 208 may include suitable logic, circuitry, interfaces, and/or code that may be configured to receive an input from a user (e.g., the user 112) and provide an output to the user 112 based on the received input. The I/O Interface 208 may include various input and output devices, which may be configured to communicate with the circuitry 202. For example, the media rendering device 102 may receive (via the I/O Interface 208) the first user input from the user 112 to scan the set of OTA channels. In another example, the media rendering device 102 may receive a second user input indicative of at least one of a country, a state, a city, a province, a postal code, or a zip code to determine a geographical region (e.g., the first geographical region 114) in which the media rendering device 102 may be located and operated. In yet another example, the media rendering device 102 may receive a third user input indicative of user preferences (such as, but not limited to, a language, media genre-of-interest) to scan the set of OTA channels. Examples of the I/O Interfaces 208 may include, but are not limited to, a touch screen, a keyboard, a mouse, a joystick, the display device 212 (for example, a display screen), a microphone, or a speaker.

The display device 212 (for example, a display screen) may comprise suitable logic, circuitry, and interfaces that may be configured to display an output of the media rendering device 102. The display device 212 may be utilized to render information about at least one of the first set of OTA channels, the second set of OTA channels, and a third set of OTA channels. In some embodiments, the display device 212 may be an external display device associated with the media rendering device 102, such as, a stand-alone TV screen. In such case, the media rendering device 102 may be a set-up box, that may be coupled to the display device 212 and work in synchronization with the display device 212. The display device 212 may be a touch screen which may enable the user 112 to provide a user input, via the display device 212. The touch screen may be at least one of a resistive touch screen, a capacitive touch screen, a thermal touch screen or any other touch screen using which inputs can be provided to the display device 212 or the circuitry 202. The display device 212 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 212 may refer to a display screen of a head mounted device (HMD), a smart-glass device, a see-through display, a projection-based display, an electro-chromic display, or a transparent display. The display device 212 may also include a user interface (UI) 214 through which a user input (such as the first user input, the second user input, and the third user input) may be received from the user 112. For example, the user input may include a zip code to scan OTA channels available for a current location (e.g., the location 118). The user interface (UI) 214 may also provide an output to the user 112.

The network interface 210 may include suitable logic, circuitry, interfaces, and/or code that may be configured to facilitate communication between the media rendering device 102 and the server 104 or any service provider devices, via the communication network 110. The network interface 210 may be implemented by use of various known technologies to support wired communication or wireless communication or a combination thereof of wired and wireless communication of the media rendering device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The media rendering device 102 as illustrated in FIG. 2 may include other suitable components or systems, in addition to the components or systems that are illustrated herein to describe and explain the function and operation of the present disclosure. A detailed description for the other components or systems of the media rendering device 102 is omitted from the present disclosure for the sake of brevity. Operations of the circuitry 202 are further described, for example, in FIGS. 3, 4, and 5.

FIG. 3 is a diagram that illustrates a first exemplary processing pipeline for scanning a set of over-the-air (OTA) channels on the media rendering device, in accordance with an embodiment of the present disclosure. FIG. 3 is explained in conjunction with elements from FIG. 1 and FIG. 2. With reference to FIG. 3, there is shown an exemplary processing pipeline 300. The exemplary processing pipeline 300 may include operations from 302 to 310 for scanning of OTA channels. The exemplary operations may be executed by any computing system, for example, by the media rendering device 102 of FIG. 1 or by the circuitry 202 of FIG. 2.

At 302, a first geographical region may be determined. In an embodiment, the media rendering device 102 may be configured to determine the first geographical region (such as, the first geographical region 114) associated with a location (such as, the location 118), as described in FIG. 1. In an embodiment, the location 118 may a current location of the media rendering device 102 and the first geographical region 114 may include the location 118. For example, the first geographical region 114 may be a state, a province, a city, or a country where the media rendering device 102 may be located. A first set of over-the-air (OTA) channels may be communicated or broadcasted in the determined first geographical region 114. In an embodiment, the media rendering device 102 may be configured to determine the first geographical region 114 and the location 118 based on at least one of Global Positioning System (GPS) information, an Internet Protocol (IP) address, or identification information of one or more service provider devices. The media rendering device 102 may include an integrated location sensor 206, for example, a Global Positioning System (GPS) sensor, that may be configured to determine the first geographical region 114 and the location 118 based on geo-location information such as, but not limited to, a latitude, a longitude, and an altitude associated with the location 118. The media rendering device 102 may automatically determine the first geographical region 114 and the location 118 of the media rendering device 102 based on the geo-location information captured by the GPS sensor. In some embodiments, the media rendering device 102 may automatically determine the location 118 based on the IP address associated with the media rendering device 102. The IP address may be configured in the media rendering device 102 during a setup of the media rendering device 102 or during an installation of a particular application in the media rendering device 102. In another embodiment, the media rendering device 102 may automatically determine the first geographical region 114 and the location 118 based on the identification information of one or more service provider devices (i.e., the first OTA service provider device 106 and the second OTA service provider device 108). The media rendering device 102 may receive the respective identification information (i.e., broadcaster ID) from each of the first OTA service provider device 106 and the second OTA service provider device 108 which may be present close to the location 118 of the media rendering device 102. The media rendering device 102 may further search an internal database (like the memory 204 or an external database like the server 104) to determine the locations of the service provider devices (i.e., the first OTA service provider device 106 and the second OTA service provider device 108) based on the received identification information. In an embodiment, based on the determined locations of nearby (or close) service provider devices, the media rendering device 102 may determine or estimate the location 118 of the media rendering device 102.

At 302A, a second user input may be received. In an embodiment, the media rendering device 102 may receive the second user input (for example, via the user interface (UI) 214) indicative of at least one of a country 312A, a state 312B, a city 312C, a province 312D, position co-ordinates 312E, a postal code 312F, or a zip code 312G, and further determine the first geographical region 114 and the location 118 based on the received second user input. In an example, the media rendering device 102 may receive the second user input (via the UI 214) including a zip code 312G from the user 112 during an initial setup of the media rendering device 102. For example, the second user input may be provided by use of an infrared-based remote associated with the media rendering device 102 or may be provided directly to the media rendering device 102. Based on the received zip code 312G, the media rendering device 102 may be configured to determine the first geographical region 114 and the location 118 of the media rendering device 102. For example, in case the media rendering device 102 does not include the location sensor 206 (i.e., GPS detector), the media rendering device 102 may determine the location 118 and the first geographical region 114 based on the second user input provided by the user 112. The media rendering device 102 may further detect the first set of OTA channels broadcasted in the determined first geographical region 114, for example by the first OTA service provider device 106 (shown in FIG. 1).

By way of example, but not limitation the UI 214 may include a first user interface (UI) element (not shown), and a second UI element (not shown). The first UI element and the second UI element may be associated with input elements of the UI 214 which may receive the second user input (via the I/O interface 208 associated with the media rendering device 102). The first UI element may, for example, correspond to a text box that may be configured to receive the second user input, for example, the second user input indicative of the at least one of the country 312A, the state 312B, the city 312C, the province 312D, position co-ordinates 312E, the postal code 312F, or the zip code 312G. For example, the media rendering device 102 may receive a zip code '22313' as the second user input. The second UI element may correspond to, for example, a button that may be configured to receive a user confirmation to submit a user input (e.g., the second user input) through the UI 214. The media rendering device 102 may further determine the first geographical region 114 and the location 118, based on the received second user input and the received user confirmation. In a scenario, where the media rendering device 102 does not include the location sensor 206 (i.e., shown in FIG. 2), in such case the media rendering device 102 may determine the location 118 and the first geographical region 114 (and/or the second geographical region 116) based on the received second user input. Control may pass to 304.

At 304, a second geographical region may be determined. In an embodiment, the media rendering device 102 may determine the second geographical region (such as, the second geographical region 116), which may fall within a threshold distance from the location 118 of the media rendering device 102. A second set of OTA channels may be communicated or broadcasted in the determined second geographical region 116. In an example, the media rendering device 102 may receive OTA signals broadcast or communicated by one or more OTA service providers (such as, from the first OTA service provider device 106 and the second OTA service provider device 108). Herein, the first OTA service provider device 106 may be associated with the first geographical region 114, and the second OTA service provider device 108 may be associated with the second geographical region 116. For example, the location 118 of the media rendering device 102 may lie in a border area between the first geographical region 114 and the second geographical region 116. For example, the second geographical region 116 may be a nearby city, state, province, or country, which may be close (or sharing borders) with the first geographical region 114. In such a case, the media rendering device 102 may receive the OTA signals broadcast in both the first geographical region 114 and the second geographical region 116. For example, the media rendering device 102 may be able to detect both the first set of OTA channels broadcast in the first geographical region 114 and the second set of OTA channels broadcast in the second geographical region 116.

In an embodiment, the first set of OTA channels associated with the first geographical region 114 may be different from the second set of OTA channels associated with the second geographical region 116. For example, the first set of OTA channels may include channels 2, 3, and 4 as HBO, Discovery Channel, and CNN, respectively, whereas the second set of OTA channels may include channels 2, 3, and 4 as Discovery Channel, HBO and CBS, respectively. There may be an overlap of the first set of OTA channels in the first geographical region 114 with the second set of OTA channels in the second geographical region 116. Further, the order or frequency band of transmission of OTA channels may be different for the different geographical regions, as a transmission frequency of a service provider in one geographical region may differ from a transmission frequency of another service provider in another geographical region. In an embodiment, there may be more than two overlap regions, based on a number of geographical regions under consideration close to the location 118 of the media rendering device 102. For example, in a case of three geographical regions, there may be various possible overlap areas between the geographical regions, based on the location 118. In an embodiment, a number of channels included in the first set of OTA channels and a number of channels included in the second set of OTA channels may also be different. For example, there may be "36" channels in the first set of OTA channels (say in United States) and there may be "40" channels in the second set of OTA channels (say in Canada).

In an embodiment, each of the first set of OTA channels and the second set of OTA channels may correspond to at least one of a television channel, an Amplitude Modulated (AM) channel, a Frequency Modulated (FM) channel, or any other audio and/or video frequency transmission channel. In an example, the television channel may be divided into two frequency bands such as a very high frequency (VHF) band including channels 2 through 13, and an ultra-high frequency (UHF) band including channels 14 to 51. In another example, the AM channel may correspond to a radio broadcast channel band that may include, but not limited to a low frequency (LF) broadcast band, a medium frequency (MF) broadcast band, or a high frequency (HF) broadcast band. In yet another example, the FM channel may correspond to a radio broadcast channel band including a VHF broadcast band. For example, the media rendering device 102 may be configured to receive a user input indicative of a selection of OTA channels from the first set of OTA channels and the second set of OTA channels, based on the received user input indicating a type of the OTA channels. Each of the first set of OTA channels and the second set of OTA channels may correspond to at least one of a television channel, an Amplitude Modulated (AM) channel, or a Frequency Modulated (FM) channel, as the type of the OTA channels. It should be known to one skilled in the art that other types of signal modulations and/or types may be included and covered within the scope of this disclosure. Such other types of signal modulations and/or types are not illustrated herein for sake of brevity.

At 306, a first user input may be received. In an embodiment, the media rendering device 102 may be configured to receive the first user input to scan the first set of OTA channels and the second set of OTA channels, where the media rendering device 102 may be located at the location 118 (i.e., boarder region or an overlapping region of the first geographical region 114 and the second geographical region 116). By way of example, and not limitation the UI 214 may include a third user interface (UI) element (not shown), a fourth UI element (not shown), and a fifth UI element (not shown), through which an input may be accepted from the user 112 and an output may be provided to the user 112. The third UI element, the fourth UI element, and the fifth UI element may be associated with input elements of the UI 214.

For example, the third UI element may correspond to a radio button, configured to receive the first user input (via the I/O interface 208, such as, a mouse input, or touch input) indicative of the confirmation from the user 112 to scan the first set of OTA channels communicated in the first geographical region 114. Similarly, the fourth UI element may correspond to another radio button, configured to receive the first user input indicative of the confirmation from the user 112 to scan the second set of OTA channels communicated in the second geographical region 116. The fifth UI element may be, for example, a button that may be configured to receive a user confirmation 306A to submit a user input (e.g., the first user input) through the UI 214. The media rendering device 102 may scan the first set of OTA channels, and the second set of OTA channels based on the received first user input and/or the user confirmation 306A through the fifth UI element. The first set of OTA channels and the second set of OTA channels may be configured, tuned, and/or stored on the media rendering device 102, based on the scan of the first set of OTA channels and the second set of OTA channels. The stored OTA channels (i.e., first set of OTA channels and the second set of OTA channels) may then be accessible to the user 112 (i.e., view or listen a particular selected channel).

During an initial setup or during a channel-scan time, the media rendering device 102 may receive the first user input to scan the OTA channels. In an example, the radio button of the third UI element may indicate 'Yes' as the user inputs, and the radio button of the fourth UI element may indicate 'No' as the user input. Based on such user inputs, via the UI 214, the media rendering device 102 may be configured to scan only the first set of OTA channels, and then configure the scanned first set of OTA channels. In another example, the radio button on the third UI element may indicate 'No' as the user input, and the radio button of the fourth UI element may indicate 'Yes' as the user input. Based on such user inputs, the media rendering device 102 may be configured to scan only the second set of OTA channels, and configure the scanned second set of OTA channels. In yet another example, the radio button of the third UI element may indicate 'Yes' as the user input, and the radio button of the fourth UI element may indicate 'Yes' as the user input. Based on such user inputs, the media rendering device 102 may be configured to scan both the first set of OTA channels and the second set of OTA channels, and configure (or tune) the scanned first set of OTA channels and the scanned second set of OTA channels on the media rendering device 102. In an embodiment, the second set of OTA channels scanned by the media rendering device 102 may only include the channels which are not included in the first set of OTA channels, such that the second set of OTA channels may correspond to non-overlapping channels and the scanning time of the media rendering device 102 may be reduced or optimized.

In an embodiment, the first user input may be indicative of a confirmation (such as, the user confirmation 306A) from the user 112 to extend a first channel map of the media rendering device 102 to a second channel map of the media rendering device 102. The first channel map may include the first set of OTA channels related to the first geographical region 114, and the second channel map may include both the first set of OTA channels and the second set of OTA channels related to the second geographical region 116. Similarly, in case other geographical regions have an overlapping area with the first geographical region 114, the media rendering device 102 may provide (i.e., through the UI 214) the user 112 with a choice of OTA channels that may be broadcasted or aired in such other geographical regions. Based on a user input to such provided choice, the media rendering device 102 may be configured to scan and configure the OTA channels of other geographical regions, in addition to the first set of OTA channels of the current geographical region in which the media rendering device 102 is located.

In an embodiment, the first user input may indicate a number of OTA channels 306B to be scanned by the media rendering device 102. By way of example, and not limitation the UI 214 may include a sixth UI element that may be a text box that may be configured to receive the first user input or may be a drop-down box indicative of the number of OTA channels 306B to be scanned by the media rendering device 102. The media rendering device 102 may configure the first channel map on the media rendering device 102 based on the scan of the first set of OTA channels for the first geographical region 114 indicated by the number of OTA channels 306B. In an embodiment, there may be multiple UI elements for each geographical region and based on an input (i.e., number of OTA channels) selected or provided for each geographical region, the media rendering device 102 may advantageously scan the number of channels indicated for each of the geographical regions and thus optimize the time spent to configure the desired number of channels for a particular geographical region.

In accordance with an embodiment, the number of OTA channels 306B indicated in the first user input may correspond to a subset of OTA channels from at least one of the first set of OTA channels and the second set of OTA channels. For example, in case the first set of OTA channels includes 40 OTA channels, the number of OTA channels 306B indicated by the first user input may be 25. In such case, only the 25 OTA channels indicated by the first user input may be scanned and configured on the media rendering device 102. In another example, the first set of OTA channels includes 40 OTA channels and the second set of OTA channels includes 54 OTA channels, and the number of OTA channels 306B indicated by the first user input may be 60. In such case, all the 40 OTA channels from the first set of OTA channels and the first 20 OTA channels (or predefined non-overlapping channels in an order) from the second set of OTA channels may be scanned and configured on the media rendering device 102. The scanned OTA channels from the second set of OTA channels may be non-overlapping with the scanned first set of OTA channels. In certain scenarios, the first user input may specifically indicate the total number of OTA channels to be scanned and configured on the media rendering device 102 from each of the first set of OTA channels and the second set of OTA channels. For example, the first user input may indicate 15 OTA channels from the first set of OTA channels and 20 OTA channels from the second set of OTA channels. Accordingly, in such case, the media rendering device 102 may scan and configure 15 OTA channels from the first set of OTA channels and 20 OTA channels from the second OTA channels, as per the provided first user input. Such a selective scan and configuration of OTA channels on the media rendering device 102 may save time and optimize the OTA channel scan and configuration process during the initial setup or during an operational setup of the media rendering device 102. Control may pass to 310.

At 308, a third user input may be received. In an embodiment, the media rendering device 102 may be configured to receive the third user input indicative of user preference 314. By way of example, and not limitation the UI 214 may include a seventh user interface (UI) element and an eighth UI element that may be associated with input elements which may be selected or through which the user input may be received from the user 112. For example, the seventh UI element may correspond to a list box that may be configured to receive the third user input indicative of a user preference 314. In some embodiments, other forms of input elements may be used instead of a list box, without any deviation from the scope of the disclosure. The eighth UI element may correspond to, for example, a button that may be configured to receive a user confirmation to submit a user input (e.g., the third user input) through the UI 214. The media rendering device 102 may scan a third set of OTA channels, based on the received third user input indicative of the user preference 314 and the received user confirmation.

In an embodiment, the media rendering device 102 may receive the third user input indicative of the user preference 314 including, for example, a language of interest 314A of the user 112, via the UI 214. The language of interest 314A may correspond to a language of media content preferred by the user 112, such as, but not be limited to, English, Chinese, Spanish, French, or German. In an embodiment, the third user input may indicate multiple languages as the preference of the user 112. The media rendering device 102 may further scan the third set of OTA channels based on the received third user input indicative of the user preference (i.e., the language(s) of interest of the user 112). The third set of OTA channels may be included in the first set of OTA channels and/or in the second set of OTA channels. In other words, the third set of OTA channels may be a subset of the combination of the first set of OTA channels and the second set of OTA channels, where the third of OTA channels may only include OTA channels including the media content with the preferred language(s) mentioned in the third user input. For example, in case the third user input indicates an English language, then the third set of OTA channels may only include English channels and filter out other language channels in the OTA channels related to one or more geographical regions determined by the media rendering device 102. The media rendering device 102 may further configure the scanned third set of OTA channels on the media rendering device 102, and also store the configured third set of OTA channels on the media rendering device 102. Therefore, the scanning and the configuration of the limited number of OTA channels (i.e., third set of OTA channels) out of the total number of the first set of OTA channels and the second set of OTA channels (i.e., related to nearby geographical regions) may reduce or optimize the time required for the channel setup as per the user preference (i.e., language).

In an embodiment, the media rendering device 102 may receive the third user input indicative of the user preference 314 including, for example, a media genre of interest 314B. The media genre of interest 314B may correspond to a genre of the media content that may be preferred by the user 112, such as, but not limited to, an action genre, an adventure genre, an animation/anime genre, a biopic genre, a children genre, a comedy genre, a crime/detective/spy genre, a documentary genre, a drama genre, a horror genre, a family genre, a fantasy genre, a historical genre, a matured content genre, a medical genre, a musical genre, a paranormal genre, a romance genre, a sport genre, a science-fiction genre, a talk show genre, a suspense/thriller genre, a war genre, or a western genre. The media rendering device 102 may scan the third set of OTA channels based on the received third user input indicative of the user preference (i.e., the media genre(s) of interest of the user 112). The third set of OTA channels may be included in the first set of OTA channels and/or the second set of OTA channels. For example, in case the third user input indicates the music genre, then the third set of OTA channels may only include music-related channels and filter out channels of other genres in the OTA channels related to one or more geographical regions determined by the media rendering device 102. The media rendering device 102 may further configure the scanned third set of OTA channels on the media rendering device 102, and also store the configured third set of OTA channels on the media rendering device 102. Therefore, the scanning and the configuration of the limited number of OTA channels (i.e., third set of OTA channels) out of the total number of the first set of OTA channels and the second set of OTA channels (i.e., related to nearby geographical regions) may reduce or optimize the time required for the channel setup as per the user preference (i.e., genre).

At 310, over-the-air (OTA) channels may be configured. In an embodiment, the media rendering device 102 may configure the first set of OTA channels and the second set of OTA channels on the media rendering device 102, based on the scan of only the second set of OTA channels, wherein the first set of OTA channels may be already pre-scanned by the media rendering device 102. For example, the media rendering device 102 may configure the first set of OTA channels including 40 OTA channels. The media rendering device 102 may receive a user input from the user 112 indicative of extension of the channel map of the media rendering device 102, or may receive a user input from the user 112 to scan the second set of OTA channels available in the second geographical region 116. For example, the second set of OTA channels may include 54 OTA channels. Accordingly, to scan the second set of OTA channels, the media rendering device 102 may only scan OTA channels beyond the channel number 40. Thus, in case a subset of 54 OTA channels of the second geographical region 116 overlap with or are same as the 40 OTA channels of the first geographical region 114, the media rendering device 102 may be configured to scan only the remaining 14 OTA channels, rather than scan of all the 54 OTA channels available in the second geographical region 116. Therefore, the disclosed media rendering device 102 may optimize the time required to scan the OTA channels. In another example, if there is an overlap of 30 channels between the first geographical region 114 and the second geographical region 116, the media rendering device 102 may be configured to scan for the remaining 24 OTA channels, thereby optimize a scan time for the second set of OTA channels.

Figure 4:
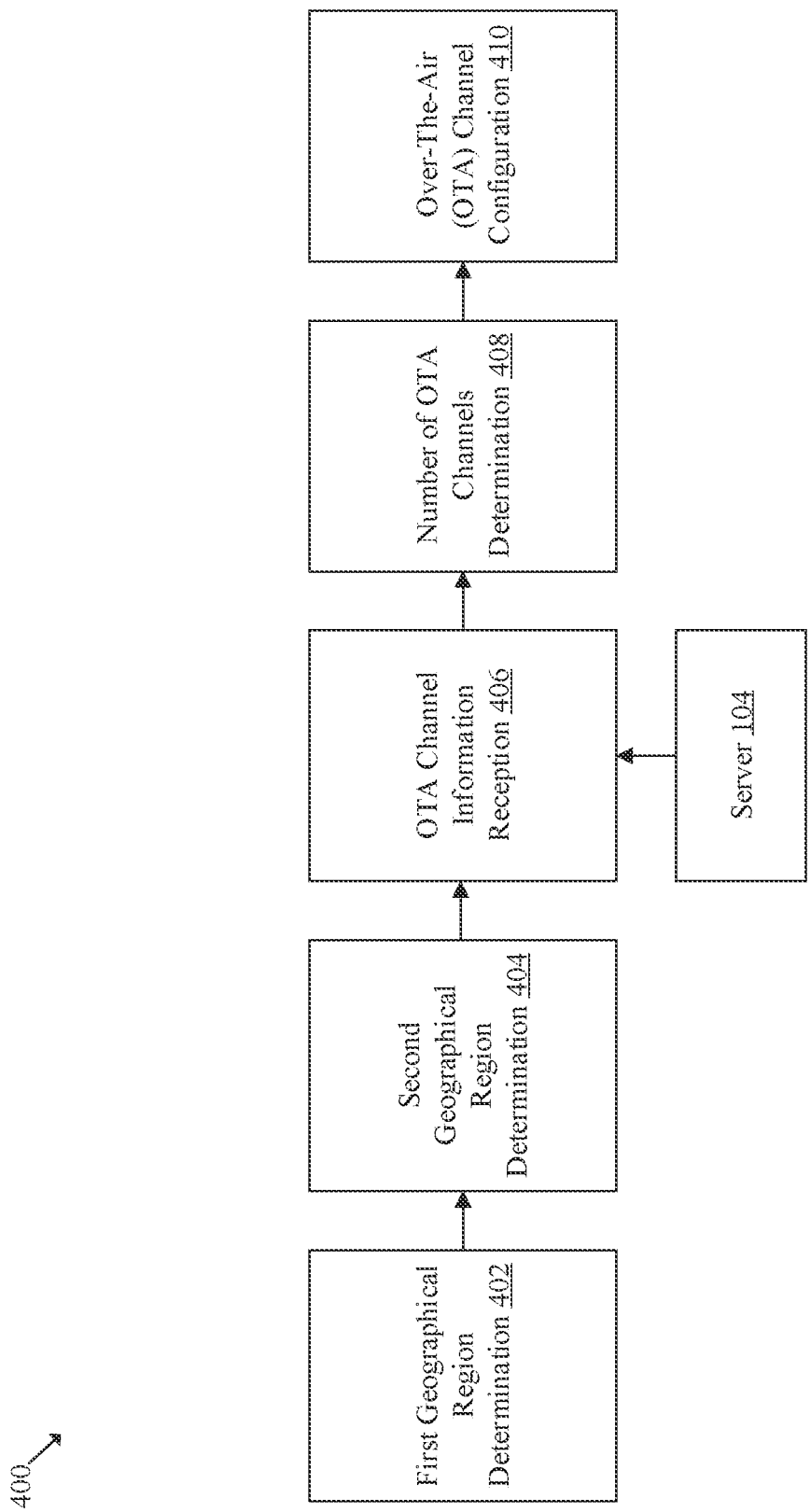
FIG. 4 is a diagram that illustrates a second exemplary processing pipeline for scanning OTA channels on the media rendering device, in accordance with an embodiment of the present disclosure.

FIG. 4 is a diagram that illustrates a second exemplary processing pipeline for scanning OTA channels on the media rendering device, in accordance with an embodiment of the present disclosure. FIG. 4 is explained in conjunction with elements from FIGS. 1, 2, and 3. With reference to FIG. 4, there is shown an exemplary processing pipeline 400. The processing pipeline 400 may include operations from 402 to 410 for scanning OTA channels. The exemplary operations may be executed by any computing system, for example, by the media rendering device 102 of FIG. 1 or by the circuitry 202 of FIG. 2.

At 402, a first geographical region may be determined. In an embodiment, the media rendering device 102 may be configured to determine the first geographical region (such as, the first geographical region 114) associated with a location (such as, the location 118), as described in FIG. 1. A first set of OTA channels may be communicated or broadcasted in the determined first geographical region 114. In an embodiment, the media rendering device 102 may be configured to determine the first geographical region 114 and the location 118 based on at least one of Global Positioning System (GPS) information, an Internet Protocol (IP) address, or identification information of one or more service provider devices. In an embodiment, the media rendering device 102 may receive the second user input (for example, via the user interface (UI) 214) indicative of at least one of a country, a state, a city, a province, position co-ordinates, a postal code, or a zip code, and further determine the first geographical region 114 and the location 118 based on the received second user input. The determination of the first geographical region 114 is described, for example, at 302 and 302A in FIG. 3.

At 404, a second geographical region may be determined. In an embodiment, the media rendering device 102 may determine the second geographical region (such as, the second geographical region 116), which may fall within a threshold distance from the location 118 of the media rendering device 102. A second set of OTA channels may be communicated or broadcasted in the determined second geographical region 116. The determination of the second geographical region 116 is described, for example, at 304 in FIG. 3.

At 406, OTA channel information may be received. In an embodiment, the media rendering device 102 may be configured to retrieve, from a server (such as, the server 104), the OTA channel information associated with the first geographical region 114 and the second geographical region 116, if such information is stored on the server 104 by a service provider. The server 104 may store the number of OTA channels communicated in different geographical regions in the OTA channel information.

At 408, a number of OTA channels may be determined. In an embodiment, the media rendering device 102 may be configured to determine a first number of OTA channels in the first set of OTA channels and a second number of OTA channels in the second set of OTA channels, based on the OTA channel information retrieved from the server 104. For example, the first set of OTA channels may include 40 OTA channels, whereas the second set of OTA channels may include 54 OTA channels.

At 410, OTA channels may be configured. In an embodiment, the media rendering device 102 may configure the first set of OTA channels and the second set of OTA channels on the media rendering device 102, based on the scan of the first set of OTA channels by use of the determined first number of OTA channels and the scan of the second set of OTA channels by use of the determined second number of OTA channels defined by the OTA channel information. The configuration of the OTA channels is described, for example, at 310 in FIG. 3.

Figure 5:
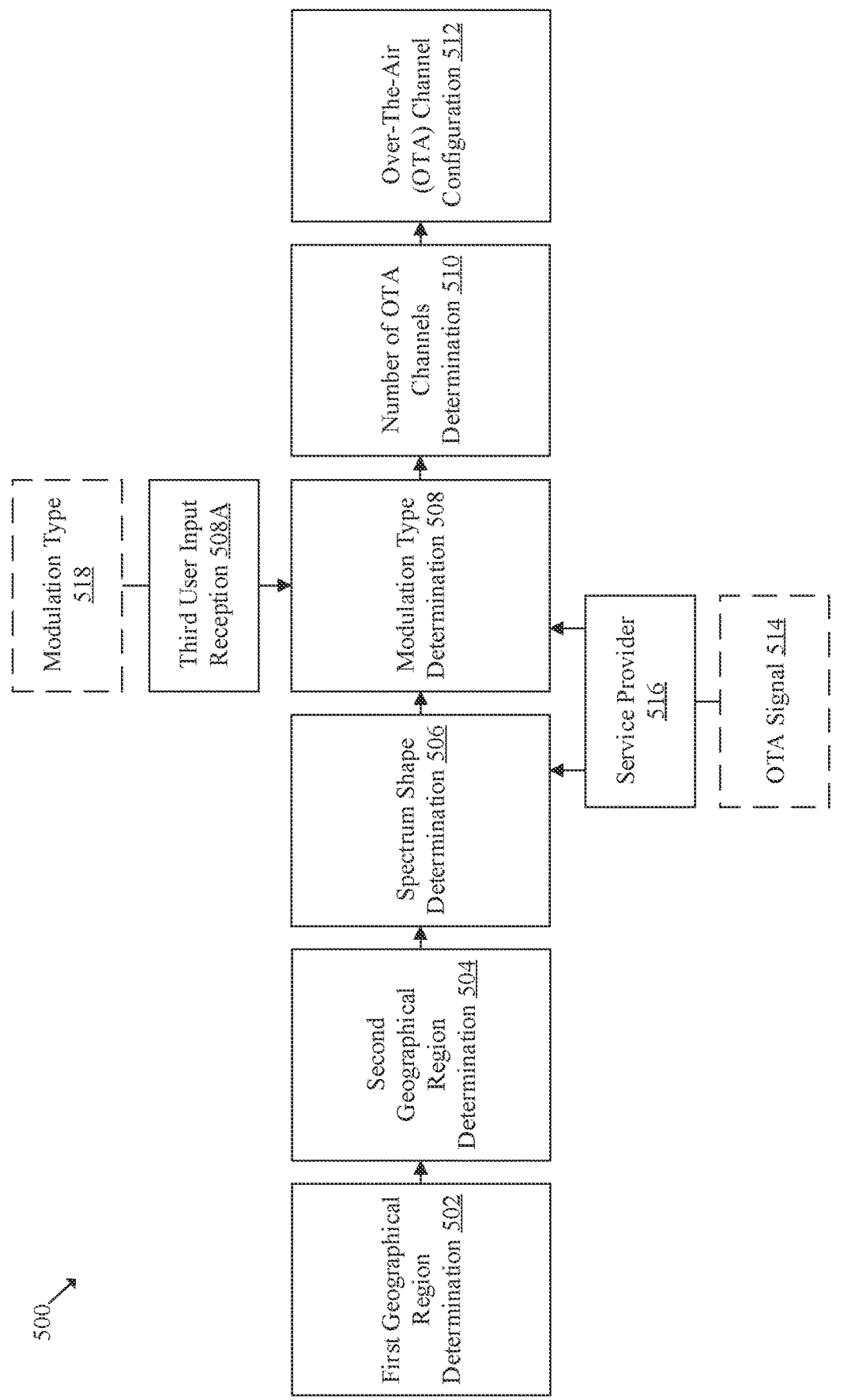
FIG. 5 is a diagram that illustrates a third exemplary processing pipeline for scanning a set of OTA channels on the media rendering device, in accordance with an embodiment of the present disclosure.

FIG. 5 is a diagram that illustrates a third exemplary processing pipeline for scanning a set of OTA channels on the media rendering device, in accordance with an embodiment of the present disclosure. FIG. 5 is explained in conjunction with elements from FIGS. 1, 2, 3, and 4. With reference to FIG. 5, there shown an exemplary pipeline 500. The exemplary pipeline 500 may include operations from 502 to 512 for scanning OTA channels. The exemplary operations may be executed by any computing system, for example, by the media rendering device 102 of FIG. 1 or by the circuitry 202 of FIG. 2.

At 502, a first geographical region may be determined. In an embodiment, the media rendering device 102 may be configured to determine the first geographical region (such as, the first geographical region 114) associated with a location (such as, the location 118), as described in FIG. 1. A first set of OTA channels may be communicated or broadcasted in the determined first geographical region 114. The determination of the first geographical region 114 is described, for example, at 302 and 302A in FIG. 3.

At 504, a second geographical region may be determined. In an embodiment, the media rendering device 102 may determine the second geographical region (such as, the second geographical region 116), which may fall within a threshold distance from the location 118 of the media rendering device 102. A second set of OTA channels may be communicated or broadcasted in the determined second geographical region 116. The determination of the second geographical region 116 is described, for example, at 304 in FIG. 3.

At 506, a spectrum shape may be determined. In an embodiment, the media rendering device 102 may be configured to determine the spectrum shape of an OTA channel frequency of an OTA signal 514 received from a service provider 516 (e.g., from the first OTA service provide device 106) associated with the first geographical region 114. The spectrum shape of the OTA channel frequency of the OTA signal 514 may be managed, for example, by government authorities (Federal Communications Commission (FCC)) for a particular geographical region (such as, the United States). Herein, the government authorities of the geographical region may impose a restriction on broadcast of certain OTA channels in the geographical region, especially, in case of an overlap of broadcast regions between two countries or states in a vicinity of the geographical region.

At 508, a modulation type may be determined. In an embodiment, the media rendering device 102 may be configured to determine the modulation type 518 associated with the received OTA signal 514 based on the determined spectrum shape. The modulation type may be associated to particular standards and/or protocols that may need to be implemented and/or followed in a particular geographical region. Examples of the modulation type 518 may include, but are not limited to, a National Television System Committee (NTSC) modulation type, an Advanced Television System Committee (ATSC) modulation type, a Digital Video Broadcast (DVB) modulation type, an Integrated Services Digital Broadcast (ISDB) modulation type, or a Digital Terrestrial Multimedia Broadcast (DTMB) modulation type.

In an embodiment, the media rendering device 102 may determine the modulation type of the OTA signal 514 received from the service provider 516 (e.g., from the first OTA service provider device 106) associated with the first geographical region 114. In other words, the media rendering device 102 may be configured to directly determine the modulation type 518 based on the service provider 516 associated with the first geographical region 114. For example, a certain service provider may broadcast OTA channels by use of a certain pre-determined modulation type, for example, the DVB modulation type.

At 508A, a third user input may be received. In an embodiment, the media rendering device 102 may be further configured to receive a third user input indicative of the modulation type 518 from the user 112. By way of example, and not limitation the UI 214 may include a UI element that may correspond to a list box, configured to receive a user input (such as, a mouse input, or touch input) indicative of the modulation type 518. The media rendering device 102 may further scan a third set of OTA channels based on the determined modulation type of the OTA signal 514 of each OTA channel. The third set of OTA channels may be included in the first set of OTA channels and the second set of OTA channels. In other words, the third set of OTA channels may be a subset of the combination of the first set of OTA channels and the second set of OTA channels, where the third of OTA channels may only include OTA channels with the determined modulation type 518 (i.e., mentioned in the third user input). The media rendering device 102 may scan and configure the scanned third set of OTA channels on the media rendering device 102. Thus, the media rendering device 102 may select OTA channels of multiple geographical regions (i.e., nearby regions) based on the modulation type 518 provided by the user 112 and only configure (or tune) the selected OTA channels, and therefore optimize the time utilized for desired channel setup.

At 510, a number of OTA channels may be determined. In an embodiment, the media rendering device 102 may determine a first number of OTA channels in the first set of OTA channels and a second number of OTA channels in the second set of OTA channels, based on the determined modulation type 518. The media rendering device 102 may configure the first set of OTA channels and the second set of OTA channels on, based on the scan of the first set of OTA channels by use of the determined first number of OTA channels and the scan of the second set of OTA channels by use of the determined second number of OTA channels.

At 512, OTA channels may be configured. In an embodiment, the media rendering device 102 may configure the first set of OTA channels and the second set of OTA channels on the media rendering device 102, based on the scan of the first set of OTA channels by use of the determined first number of OTA channels and the scan of the second set of OTA channels by use of the determined second number of OTA channels defined by the OTA channel information. The configuration of the OTA channels is described, for example, at 310 in FIG. 3.

Figure 6:
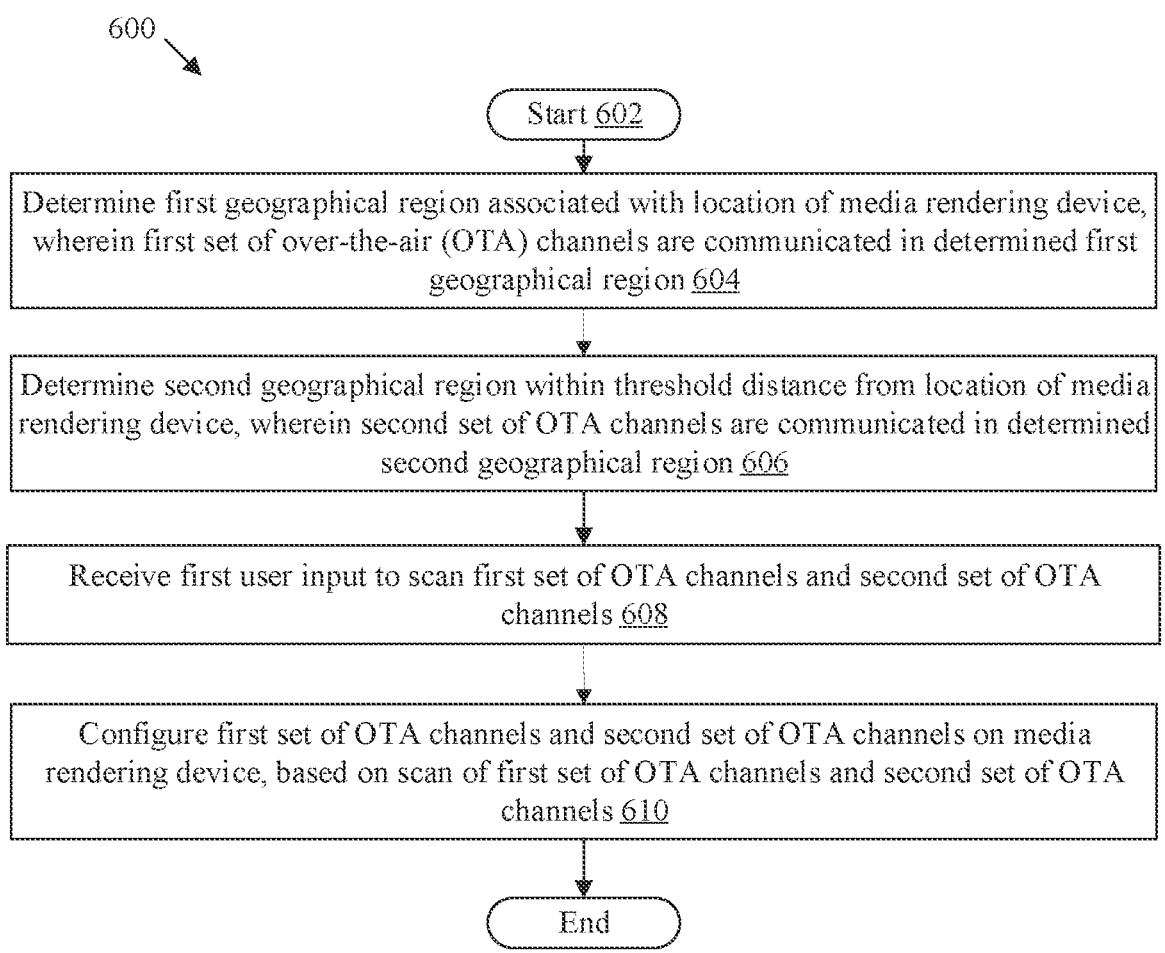
FIG. 6 is a flowchart that illustrates an exemplary method for scanning channels on the media rendering device, in accordance with an embodiment of the present disclosure.

FIG. 6 is a flowchart that illustrates an exemplary method for scanning channels on the media rendering device, in accordance with an embodiment of the present disclosure. FIG. 6 is explained in conjunction with elements from FIGS. 1, 2, 3, 4, and 5. With reference to FIG. 6, there is shown a flowchart 600. The operations of the flowchart 600 may be executed by and/or on a computing system, such as, the media rendering device 102 of FIG. 1 or the circuitry 202 of FIG. 2. The operations may start at 602 and proceed to 604.

At 604, the first geographical region 114 associated with the location 118 of the media rendering device 102 may be determined. Herein, the first set of OTA channels may be communicated or broadcasted in the determined first geographical region 114. In one or more embodiments, the circuitry 202 of the media rendering device 102 may be configured to determine the first geographical region 114 associated with a location (such as the location 118) where the media rendering device 102 may be currently located. The determination of the first geographical region 114 is described further, for example, in FIG. 3 (at 302).

At 606, the second geographical region 116 within a threshold distance from the location 118 of the media rendering device 102 may be determined. Herein, the second set of OTA channels may be communicated or broadcasted in the determined second geographical region 116. In one or more embodiments, the circuitry 202 of the media rendering device 102 may be configured to determine the second geographical region 116 within the threshold distance from the location 118 of the media rendering device 102. The determination of the second geographical region 116 is described further, for example, in FIG. 3 (at 304).

At 608, the first user input may be received to scan the first set of OTA channels and the second set of OTA channels. In one or more embodiments, the circuitry 202 of the media rendering device 102 may be configured to receive the first user input (e.g., through the UI 214) to initiate a scan of the first set of OTA channels and the second set of OTA channels, as described further, for example, in FIG. 3 (at 306). In an embodiment, the first user input may correspond to a confirmation from the user 112 to extend a first channel map (i.e., including the first set of OTA channels) to a second channel map (i.e., including both the first set of OTA channels and the second set of OTA channels).

At 610, the first set of OTA channels and the second set of OTA channels may be configured on the media rendering device 102 based on the scan of the first set of OTA channels and the second set of OTA channels. In one or more embodiments, the circuitry 202 of the media rendering device 102 may configure (or tune) the first set of OTA channels and the second set of OTA channels on the media rendering device 102, based on the scan of the first set of OTA channels and the second set of OTA channels, as described further, for example, in FIG. 3 (at 310). In an embodiment, the scanned OTA channels from the second set of OTA channels may be non-overlapping with the scanned first set of OTA channels. In other words, the second set of OTA channels configured on the media rendering device 102 may not be included in the first set of OTA channels. Control may pass to end.

Although the flowchart 600 is illustrated as discrete operations, such as 604, 606, 608, and 610, the disclosure may not be so limiting. Accordingly, in certain embodiments, such discrete operations may be further divided into additional operations, combined into fewer operations, or eliminated, depending on the particular implementation without deviating from the essence of the disclosed embodiments. The order of the steps indicated may vary.

Various embodiments of the present disclosure may provide a non-transitory computer readable medium and/or storage medium having stored thereon, instructions executable by a machine and/or a computer (for example, the media rendering device 102). The instructions may cause the machine and/or computer (for example, the media rendering device 102) to perform operations that include determination of a first geographical region (such as the first geographical region 114) associated with a location (such as the location 118) of the media rendering device 102. A first set of over-the-air (OTA) channels may be communicated in the determined first geographical region 114. The operations may further include determination of a second geographical region (such as the second geographical region 116) within a threshold distance from the location 118 of the media rendering device 102. A second set of OTA channels may be communicated in the determined second geographical region 116. The operations may further include receipt of a first user input to scan the first set of OTA channels and the second set of OTA channels. The operations may further include configuration of the first set of OTA channels and the second set of OTA channels on the media rendering device 102, based on the scan of the first set of OTA channels and scan of the second set of OTA channels.

Exemplary aspects of the present disclosure may include a media rendering device (such as, the media rendering device 102) that may include circuitry (such as the circuitry 202). The circuitry 202 may be configured to determine a first geographical region (such as, the first geographical region 114) associated with a location (such as, the location 118) of the media rendering device 102. A first set of over-the-air (OTA) channels may be communicated in the determined first geographical region 114. The circuitry 202 may be configured to determine a second geographical region (such as, the second geographical region 116) within a threshold distance from the location 118 of the media rendering device 102. A second set of OTA channels may be communicated in the determined second geographical region 116. The circuitry 202 may be further configured to receive a first user input to scan the first set of OTA channels and the second set of OTA channels. Based on the scan of the first set of OTA channels and the second set of OTA channels, the circuitry 202 may configure the first set of OTA channels and the second set of OTA channels on the media rendering device 102.

In accordance with an embodiment, the circuitry 202 of the media rendering device 102 may be further configured to receive a second user input indicative of a pre-defined parameter such as at least one of a country 312A, a state 312B, a city 312C, a province 312D, position co-ordinates 312E, a postal code 312F, or a zip code 312G. Based on the received second user input, the circuitry 202 may be further configured to determine the first geographical region 114 and the location 118. In accordance with an embodiment, the circuitry 202 of the media rendering device may be further configured to determine the first geographical region 114 and the location 118 based on at least one of Global Positioning System (GPS) information, an Internet Protocol (IP) address associated with the media rendering device 102, or identification information of one or more service provider devices.

In accordance with an embodiment, the first user input may be indicative of a confirmation from a user (such as the user 112) to extend a first channel map of the media rendering device 102 to a second channel map of the media rendering device 102. The first channel map may include the first set of OTA channels related to the first geographical region 114, and the second channel map may include the first set of OTA channels and the second set of OTA channels related to the second geographical region 116. In accordance with an embodiment, the first user input may indicate a number of OTA channels to be scanned by the media rendering device 102. In accordance with an embodiment, the number of OTA channels may correspond to a subset of OTA channels from at least one of the first set of OTA channels or the second set of OTA channels.

In accordance with an embodiment, the circuitry 202 of the media rendering device 102 may be further configured to scan and configure the first set of OTA channels and the second set of OTA channels on the media rendering device 102, based on the scan of only the second set of OTA channels. The first set of OTA channels may be pre-scanned by the media rendering device 102. In accordance with an embodiment, the circuitry 202 of the media rendering device 102 may be further configured to receive a third user input indicative of user preference 314 including a language of interest 314A. Based on the received third user input indicative of the user preference 314, the circuitry 202 may be further configured to scan a third set of OTA channels. The third set of OTA channels may be included in the first set of OTA channels and the second set of OTA channels. The circuitry 202 may configure the scanned third set of OTA channels on the media rendering device 102.

In accordance with an embodiment, the circuitry 202 of the media rendering device may be further configured to receive the third user input indicative of user preference 314 including a media genre of interest 314B. Based on the received third user input indicative of the user preference 314, the circuitry 202 may be further configured to scan a third set of OTA channels. The third set of OTA channels may be included in the first set of OTA channels and the second set of OTA channels. The circuitry 202 may further configure the scanned third set of OTA channels on the media rendering device 102.

In accordance with an embodiment, the circuitry 202 of the media rendering device may be further configured to retrieve, from a server (such as the server 104), OTA channel information associated with the first geographical region 114 and/or the second geographical region 116. The circuitry 202 may be configured to determine a first number of OTA channels in the first set of OTA channels and/or a second number of OTA channels in the second set of OTA channels, based on the retrieved OTA channel information. Based on the scan of the first set of OTA channels using the determined first number of OTA channels and the scan of the second set of OTA channels using the determined second number of OTA channels, the circuitry 202 may further configure the first set of OTA channels and the second set of OTA channels on the media rendering device 102.

In accordance with an embodiment, the circuitry 202 of the media rendering device 102 may be further configured to determine a spectrum shape of an OTA channel frequency of an OTA signal 514 received from a service provider 516 associated with the first geographical region 114. The circuitry 202 may be further configured to determine a modulation type 518 associated with the received OTA signal 514 based on the determined spectrum shape. The circuitry 202 may be further configured to determine a first number of OTA channels in the first set of OTA channels and a second number of OTA channels in the second set of OTA channels, based on the determined modulation type 518. The circuitry 202 may configure the first set of OTA channels and the second set of OTA channels, based on the scan of the first set of OTA channels using the determined first number of OTA channels and the scan of the second set of OTA channels using the determined second number of OTA channels.

In accordance with an embodiment, the circuitry 202 of the media rendering device 102 may be configured to determine a modulation type 518 of an OTA signal 514 received from a service provider 516 associated with the first geographical region 114. The circuitry 202 may be further configured to scan a third set of OTA channels based on the determined modulation type 518. The third set of OTA channels may be included in the first set of OTA channels and the second set of OTA channels. The circuitry 202 may further configure the scanned third set of OTA channels on the media rendering device 102. In accordance with an embodiment, the circuitry 202 of the media rendering device may be further configured to receive the third user input indicative of the modulation type 518. In accordance with an embodiment, each of the first set of OTA channels and the second set of OTA channels may correspond to at least one of a television channel, an Amplitude Modulated (AM) channel or a Frequency Modulated (FM) channel. In accordance with an embodiment, the first set of OTA channels associated with the first geographical region 114 may be different from the second set of OTA channels associated with the second geographical region 116.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system, may control the computer system such that it carries out the methods described herein. The present disclosure may be realized in hardware that comprises a portion of an integrated circuit that also performs other functions. The present disclosure may also be realized as a firmware which form part of the media rendering device.

The present disclosure may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A media rendering device, comprising:
circuitry configured to:
   determine a first geographical region associated with a location of the media rendering device, wherein a first set of over-the-air (OTA) channels are communicated in the determined first geographical region;
   determine a second geographical region within a threshold distance from the location of the media rendering device, wherein a second set of OTA channels are communicated in the determined second geographical region;
   receive a first user input to scan the first set of OTA channels and the second set of OTA channels, wherein
      the first user input indicates a number of OTA channels to be scanned by the media rendering device, and
      the number of OTA channels corresponds to a subset of OTA channels from the first set of OTA channels and the second set of OTA channels; and
   configure the first set of OTA channels and the second set of OTA channels on the media rendering device, based on the scan of the first set of OTA channels and the second set of OTA channels.

2. The media rendering device according to claim 1, wherein the circuitry is further configured to:
   receive a second user input indicative of at least one of a country, a state, a city, a province, position co-ordinates, a postal code, or a zip code; and
   determine the first geographical region and the location of the media rendering device based on the received second user input.

3. The media rendering device according to claim 1, wherein the circuitry is further configured to determine the first geographical region and the location of the media rendering device based on at least one of Global Positioning System (GPS) information, an Internet Protocol (IP) address associated with the media rendering device, or identification information of one or more service provider devices.

4. The media rendering device according to claim 1, wherein
   the first user input is indicative of a confirmation from a user to extend a first channel map of the media rendering device to a second channel map of the media rendering device,
   the first channel map includes the first set of OTA channels corresponding to the first geographical region, and
   the second channel map includes the first set of OTA channels and the second set of OTA channels corresponding to the second geographical region.

5. The media rendering device according to claim 1, wherein
   the circuitry is further configured to configure the first set of OTA channels and the second set of OTA channels on the media rendering device, based on the scan of only the second set of OTA channels, and
   the first set of OTA channels are pre-scanned by the media rendering device.

6. The media rendering device according to claim 1, wherein the circuitry is further configured to:
   receive a third user input indicative of user preference which indicates a language of interest;
   scan a third set of OTA channels based on the received third user input indicative of the user preference, wherein the third set of OTA channels are included in the first set of OTA channels and the second set of OTA channels; and
   configure the scanned third set of OTA channels on the media rendering device.

7. The media rendering device according to claim 1, wherein the circuitry is further configured to:
   receive a third user input indicative of user preference which indicates a media genre of interest;
   scan a third set of OTA channels based on the received third user input indicative of the user preference, wherein the third set of OTA channels are included in the first set of OTA channels and the second set of OTA channels; and
   configure the scanned third set of OTA channels on the media rendering device.

8. The media rendering device according to claim 1, wherein the circuitry is further configured to:
retrieve, from a server, OTA channel information associated with the first geographical region and the second geographical region;
determine a first number of OTA channels in the first set of OTA channels and a second number of OTA channels in the second set of OTA channels, based on the retrieved OTA channel information; and
configure the first set of OTA channels and the second set of OTA channels on the media rendering device, based on the scan of the first set of OTA channels using the determined first number of OTA channels and the scan of the second set of OTA channels using the determined second number of OTA channels.

9. The media rendering device according to claim 1, wherein the circuitry is further configured to:
determine a spectrum shape of an OTA channel frequency of an OTA signal received from a service provider associated with the first geographical region;
determine a modulation type of the received OTA signal based on the determined spectrum shape;
determine a first number of OTA channels in the first set of OTA channels and a second number of OTA channels in the second set of OTA channels, based on the determined modulation type; and
configure the first set of OTA channels and the second set of OTA channels on the media rendering device, based on the scan of the first set of OTA channels using the determined first number of OTA channels and the scan of the second set of OTA channels using the determined second number of OTA channels.

10. The media rendering device according to claim 1, wherein the circuitry is further configured to:
determine a modulation type of an OTA signal received from a service provider associated with the first geographical region;
scan a third set of OTA channels based on the determined modulation type, wherein the third set of OTA channels are included in the first set of OTA channels and the second set of OTA channels; and
configure the scanned third set of OTA channels on the media rendering device.

11. The media rendering device according to claim 10, wherein the circuitry is further configured to receive a third user input indicative of the modulation type.

12. The media rendering device according to claim 1, wherein each of the first set of OTA channels and the second set of OTA channels corresponds to at least one of a television channel, an Amplitude Modulated (AM) channel, or a Frequency Modulated (FM) channel.

13. The media rendering device according to claim 1, wherein the first set of OTA channels associated with the first geographical region is different from the second set of OTA channels associated with the second geographical region.

14. A method, comprising:
in a media rendering device:
determining a first geographical region associated with a location of the media rendering device, wherein a first set of over-the-air (OTA) channels are communicated in the determined first geographical region;
determining a second geographical region within a threshold distance from the location of the media rendering device, wherein a second set of OTA channels are communicated in the determined second geographical region;
receiving a first user input to scan the first set of OTA channels and the second set of OTA channels, wherein
the first user input indicates a number of OTA channels to be scanned by the media rendering device, and
the number of OTA channels corresponds to a subset of OTA channels from the first set of OTA channels and the second set of OTA channels; and
configuring the first set of OTA channels and the second set of OTA channels on the media rendering device, based on the scan of the first set of OTA channels and the second set of OTA channels.

15. The method according to claim 14, further comprising:
receiving a second user input indicative of at least one of a country, a state, a city, a province, position co-ordinates, a postal code, or a zip code; and
determining the first geographical region and the location based on the received second user input.

16. The method according to claim 14, wherein
the first user input is indicative of a confirmation from a user to extend a first channel map of the media rendering device to a second channel map of the media rendering device,
the first channel map includes the first set of OTA channels related to the first geographical region, and
the second channel map includes the first set of OTA channels and the second set of OTA channels related to the second geographical region.

17. The method according to claim 14, further comprising:
receiving a third user input indicative of user preference which indicates a language of interest;
scanning a third set of OTA channels based on the received third user input indicative of the user preference, wherein the third set of OTA channels are included in the first set of OTA channels and the second set of OTA channels; and
configuring the scanned third set of OTA channels.

18. A non-transitory computer-readable medium having stored thereon, computer-executable instructions that when executed by a media rendering device, causes the media rendering device to execute operations, the operations comprising:
determining a first geographical region associated with a location of the media rendering device, wherein a first set of over-the-air (OTA) channels are communicated in the determined first geographical region;
determining a second geographical region within a threshold distance from the location of the media rendering device, wherein a second set of OTA channels are communicated in the determined second geographical region;
receiving a user input to scan the first set of OTA channels and the second set of OTA channels, wherein
the user input indicates a number of OTA channels to be scanned by the media rendering device, and
the number of OTA channels corresponds to a subset of OTA channels from the first set of OTA channels and the second set of OTA channels; and
configuring the first set of OTA channels and the second set of OTA channels on the media rendering device, based on the scan of the first set of OTA channels and the second set of OTA channels.

19. A media rendering device, comprising:
circuitry configured to:

determine a first geographical region associated with a location of the media rendering device, wherein a first set of over-the-air (OTA) channels are communicated in the determined first geographical region;

determine a second geographical region within a threshold distance from the location of the media rendering device, wherein a second set of OTA channels are communicated in the determined second geographical region;

receive a user input to scan the first set of OTA channels and the second set of OTA channels, wherein
 the user input is indicative of a confirmation from a user to extend a first channel map of the media rendering device to a second channel map of the media rendering device,
 the first channel map includes the first set of OTA channels corresponding to the first geographical region, and
 the second channel map includes the first set of OTA channels and the second set of OTA channels corresponding to the second geographical region; and configure the first set of OTA channels and the second set of OTA channels on the media rendering device, based on the scan of the first set of OTA channels and the second set of OTA channels.

20. A media rendering device, comprising:
circuitry configured to:
 determine a first geographical region associated with a location of the media rendering device, wherein a first set of over-the-air (OTA) channels are communicated in the determined first geographical region;
 determine a second geographical region within a threshold distance from the location of the media rendering device, wherein a second set of OTA channels are communicated in the determined second geographical region;
 receive a first user input to scan the first set of OTA channels and the second set of OTA channels; and
 configure the first set of OTA channels and the second set of OTA channels on the media rendering device, based on the scan of only the second set of OTA channels, wherein the first set of OTA channels are pre-scanned by the media rendering device.

21. A media rendering device, comprising:
circuitry configured to:
 determine a first geographical region associated with a location of the media rendering device, wherein a first set of over-the-air (OTA) channels are communicated in the determined first geographical region;
 determine a second geographical region within a threshold distance from the location of the media rendering device, wherein a second set of OTA channels are communicated in the determined second geographical region;
 receive a first user input to scan the first set of OTA channels and the second set of OTA channels;
 configure the first set of OTA channels and the second set of OTA channels on the media rendering device, based on the scan of the first set of OTA channels and the second set of OTA channels;
 receive a third user input indicative of user preference which indicates a media genre of interest;
 scan a third set of OTA channels based on the received third user input indicative of the user preference, wherein the third set of OTA channels are included in the first set of OTA channels and the second set of OTA channels; and
 configure the scanned third set of OTA channels on the media rendering device.

* * * * *